(12) United States Patent
Kishiro et al.

(10) Patent No.: US 11,255,437 B2
(45) Date of Patent: Feb. 22, 2022

(54) SEALING DEVICE (71) Applicant: NOK CORPORATION, Tokyo (JP)

(72) Inventors: Masamichi Kishiro, Fukushima (JP); Tatsuya Mori, Fukushima (JP); Naoki Meguro, Fukushima (JP)

(73) Assignee: NOK CORPORATION, Tokyo (JP)

(*) Notice: Subject to any disclaimer, the term of this patent is extended or adjusted under 35 U.S.C. 154(b) by 134 days.

(21) Appl. No.: 16/499,007

(22) PCT Filed: Mar. 30, 2018

(86) PCT No.: PCT/JP2018/013548
§ 371 (c)(1),
(2) Date: Sep. 27, 2019

(87) PCT Pub. No.: WO2018/190145
PCT Pub. Date: Oct. 18, 2018

(65) Prior Publication Data
US 2020/0049255 A1 Feb. 13, 2020

(30) Foreign Application Priority Data

Apr. 12, 2017 (JP) .............................. JP2017-078566

(51) Int. Cl.
*F16J 15/32* (2016.01)
*F16J 15/26* (2006.01)
(Continued)

(52) U.S. Cl.
CPC ........... *F16J 15/26* (2013.01); *F16J 15/3204* (2013.01); *F16F 9/36* (2013.01); *F16J 15/3284* (2013.01); *F16J 15/56* (2013.01); *F16L 17/08* (2013.01)

(58) Field of Classification Search
CPC ...... F16J 15/26; F16J 15/3204; F16J 15/3284; F16J 15/56; F16F 9/36; F16L 17/08
See application file for complete search history.

(56) References Cited

U.S. PATENT DOCUMENTS 3,495,843 A * 2/1970 Andersen ............. F16J 15/3216
277/505
4,300,778 A 11/1981 Gagne
(Continued)

FOREIGN PATENT DOCUMENTS

JP 2003294154 A 10/2003
JP 2005090569 A 4/2005
(Continued)

OTHER PUBLICATIONS

Extended European Search Report for European Appl. No. 18784518.5 (PCT/JP2018/013548) dated Dec. 1, 2020.
(Continued)

*Primary Examiner* — Gilbert Y Lee
(74) *Attorney, Agent, or Firm* — Pearne & Gordon LLP (57) ABSTRACT

[Problem] To provide a sealing device having high pressure resistance and durability for a reciprocating shaft.
[Solution] A sealing device comprising an oil seal member and a dust seal member. The oil seal member and the dust seal member each comprise a rigid ring provided inside a shaft hole and an elastic ring attached to the rigid ring, wherein the elastic ring has formed thereon a lip that slidably contacts a reciprocating shaft. The rigid ring of the dust seal member is detachably fitted in the rigid ring of the oil seal member. The sealing device further comprises another rigid ring provided between the elastic ring of the oil seal member and the elastic ring of the dust seal member in a direction parallel to the axial direction of the reciprocating shaft. This rigid ring is detachably fitted in a concave portion formed radially inward of the rigid ring of the dust seal member and reinforces the elastic ring of the dust seal member.

9 Claims, 6 Drawing Sheets

(51) Int. Cl.
*F16J 15/3204* (2016.01)
*F16F 9/36* (2006.01)
*F16J 15/3284* (2016.01)
*F16J 15/56* (2006.01)
*F16L 17/08* (2006.01)

(56) References Cited

U.S. PATENT DOCUMENTS

| | | | | |
|---|---|---|---|---|
| 5,326,112 | A | * | 7/1994 | Paykin .................. F16J 15/166 |
| | | | | 277/565 |
| 5,456,475 | A | * | 10/1995 | Abraham ............. B01D 33/801 |
| | | | | 210/171 |
| 2004/0169339 | A1 | | 9/2004 | Bock et al. |
| 2007/0052180 | A1 | | 3/2007 | Watanabe et al. |

FOREIGN PATENT DOCUMENTS

| | | | |
|---|---|---|---|
| JP | 2007107550 | A | 4/2007 |
| JP | 4332703 | B2 | 9/2009 |
| JP | 2015045357 | A | 3/2015 |

OTHER PUBLICATIONS

International Search Report for PCT/JP2018/013548 dated Jun. 26, 2018.

* cited by examiner

SEALING DEVICE

TECHNICAL FIELD

The present invention pertains to a sealing device to be used for sealing the area around a shaft of an instrument having a reciprocating shaft.

BACKGROUND ART

In instruments having reciprocating shafts such as hydraulic cylinder devices and shock absorbers, a sealing device for sealing an annular interval between a reciprocating shaft and a shaft hole inner surface is provided between the reciprocating shaft and the shaft hole inner surface.

Patent document 1 discloses a sealing device for a shock absorber of a vehicle suspension device. This sealing device has: a metal reinforcement ring; a main lip disposed on an inner peripheral portion of the reinforcement ring and provided on an oil chamber side; and a dust lip disposed on the inner peripheral portion of the reinforcement ring and provided on an outer space side. The main lip and the dust lip are formed from an elastic material such as fluororubber and are adhered to the reinforcement ring. More precisely, an elastic body part comprising the main lip and an elastic body part comprising the dust lip are adhered, respectively, to the two surfaces of the reinforcement ring. Further, a thin elastic body part for coupling these elastic body parts is adhered to the inner periphery surface of the reinforcement ring.

Patent document 2 discloses a sealing device for a shock absorber, said sealing device having provided therein a back-up ring for reinforcing the main lip.

PRIOR ART DOCUMENTS

Patent Documents

Patent Document 1: Japanese Patent No. 4332703 B
Patent Document 2: JP 2005-090569 A

SUMMARY OF INVENTION

Technical Problem

Accompanying the greater variation in vehicle driving environments and ways of being driven, the usage conditions of sealing devices for shock absorbers have become harsher. Further, when internal oil pressure is high such as in a monotube-type shock absorber, designing requires consideration of the pressure resistance and the durability of the sealing device.

Here, the objective of the present invention is to provide a sealing device that has high pressure resistance and durability.

Solution to Problem

The sealing device according to the present invention is a sealing device to be provided between a reciprocating shaft and an inner surface of a shaft hole in which the reciprocating shaft is provided, wherein the sealing device comprises: an oil seal member comprising a liquid-side rigid ring made of a rigid body and provided inside the shaft hole, and a liquid-side elastic ring made of an elastic body and attached to the liquid-side rigid ring, the liquid-side elastic ring having formed thereon an oil lip that is provided radially inward of the liquid-side rigid ring and slidably makes sealing contact with the reciprocating shaft; a dust seal member comprising an atmosphere-side rigid ring made of a rigid body and detachably fitted in the liquid-side rigid ring, and an atmosphere-side elastic ring made of an elastic body and fixed to the atmosphere-side rigid ring, the atmosphere-side elastic ring having formed thereon a dust lip that is provided radially inward of the atmosphere-side rigid ring and slidably contacts the reciprocating shaft; and an intermediate rigid ring that is made of a rigid body, is detachably fitted in a concave portion formed radially inward of the atmosphere-side rigid ring, is provided between the liquid-side elastic ring and the atmosphere-side elastic ring in a direction parallel to the axial direction of the reciprocating shaft, and reinforces the liquid-side elastic ring.

In this sealing device, the oil seal member and the dust seal member are separate members, the oil seal member and the dust seal member each comprise a rigid ring provided inside the shaft hole and an elastic ring attached to the rigid ring, and the elastic ring has formed thereon a lip that slidably contacts the reciprocating shaft. Between the liquid-side elastic ring of the oil seal member and the atmosphere-side elastic ring of the dust seal member, an intermediate rigid ring, which is separate to the foregoing members, is provided in a direction parallel to the axial direction of the reciprocating shaft, and the liquid-side elastic ring is reinforced by the intermediate rigid ring which is made of a rigid body. The liquid-side elastic ring which has an oil lip formed thereon is reinforced by the liquid-side rigid ring, and the atmosphere-side elastic ring which has a dust lip formed thereon is reinforced by the atmosphere-side rigid ring, and furthermore, the liquid-side elastic ring is supported by the intermediate rigid ring, the intermediate rigid ring being fitted in a concave portion of the atmosphere-side rigid ring fitted in the liquid-side rigid ring, and rigidly supported with a strong supporting force by the atmosphere-side rigid ring and the liquid-side rigid ring. Therefore, it is possible to enhance the pressure resistance and the durability of the sealing device.

In a sealing device in one embodiment of the present invention, the intermediate rigid ring is detachably fitted in a concave portion formed radially inward of the liquid-side elastic ring. In this case, after the intermediate rigid ring is fitted in the concave portion of the atmosphere-side rigid ring, it is easy to assemble the liquid-side elastic ring of the oil seal member to the intermediate rigid ring.

In a sealing device in one embodiment of the present invention, at least the inner peripheral surface of the intermediate rigid ring is formed from a metal that is softer than the outer peripheral surface of the reciprocating shaft. In this case, it is possible to use the intermediate rigid ring as a guide for guiding the reciprocal movement of the reciprocating shaft.

In a sealing device in one embodiment of the present invention, an elastic material is not fixed to the inner peripheral surface of the intermediate rigid ring. In this case, there is no risk of an elastic material peeling from the inner peripheral surface of the intermediate rigid ring, and further, it is possible to set a smaller gap between the intermediate rigid ring and the reciprocating shaft. Accordingly, it is possible to further enhance the pressure resistance and the durability of the sealing device.

Advantageous Effects of Invention

In the present invention, between the liquid-side elastic ring of the oil seal member and the atmosphere-side elastic ring of the dust seal member, an intermediate rigid ring, which is different to the foregoing members, is provided in a direction parallel to the axial direction of the reciprocating shaft, and the liquid-side elastic ring is reinforced by the intermediate rigid ring which is made of a rigid body. The liquid-side elastic ring which has an oil lip formed thereon is reinforced by the liquid-side rigid ring, and the atmosphere-side elastic ring which has a dust lip formed thereon is reinforced by the atmosphere-side rigid ring, and furthermore, the liquid-side elastic ring is supported by the intermediate rigid ring, the intermediate rigid ring being fitted in a concave portion of the atmosphere-side rigid ring fitted in the liquid-side rigid ring, and rigidly supported with a strong supporting force by the atmosphere-side rigid ring and the liquid-side rigid ring. Therefore, it is possible to enhance the pressure resistance and the durability of the sealing device. Further, the oil seal member, the dust seal member, and the intermediate rigid ring are mutually separate members, and therefore, it is possible to exchange any of these members for a suitable member or select a suitable member according to the circumstances. For example, if the oil seal member has degraded due to age, it is possible to exchange only the oil seal member. Further, it is possible to prepare several kinds of oil seal members and several kinds of dust seal members having different sizes, shapes, structures, or other details, and to select a suitable oil seal member or dust seal member according to the environment in which the sealing device is to be used.

DESCRIPTION OF EMBODIMENTS

Below, various embodiments of the present invention are described with reference to the attached drawings.

First Embodiment

Figure 1:
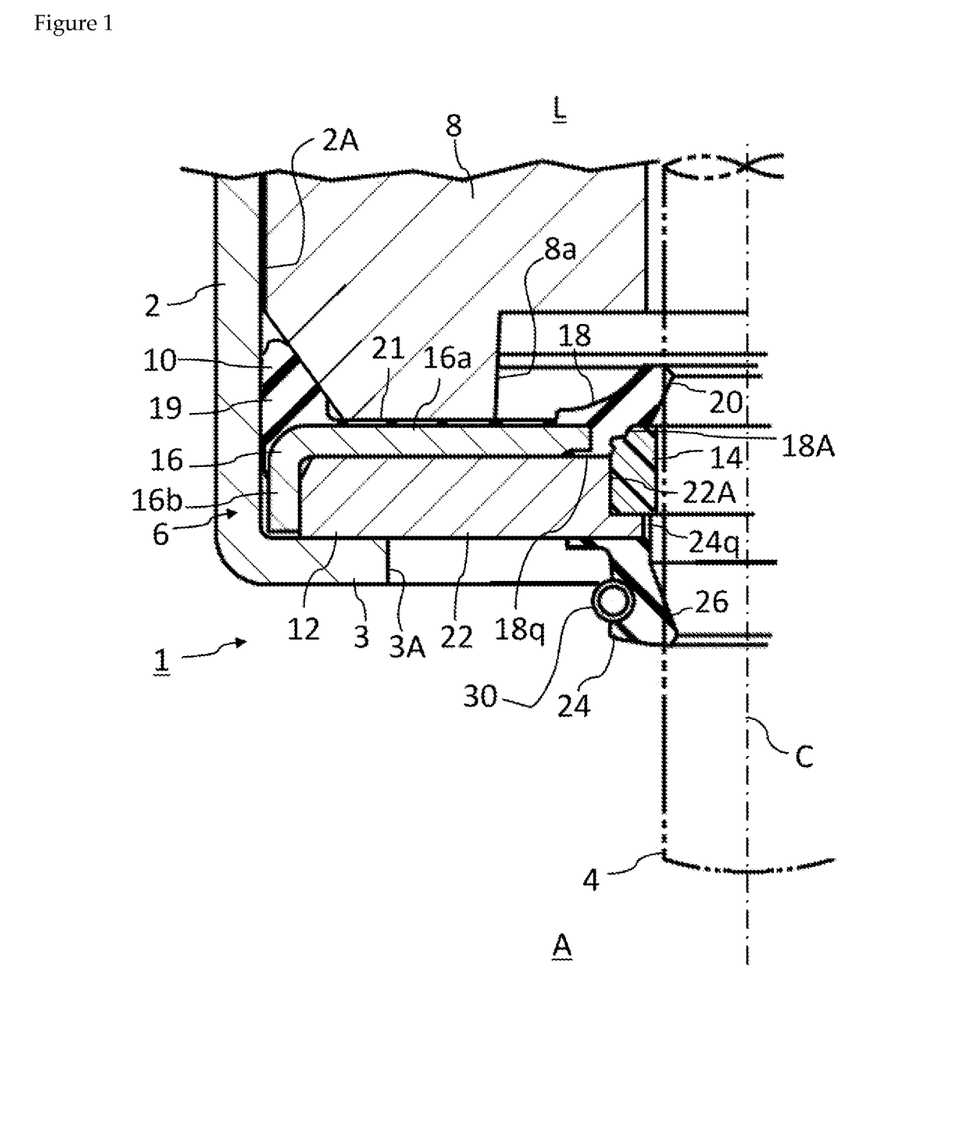
FIG. 1 is a cross-sectional view of a sealing device according to a first embodiment of the present invention.

FIG. 1 shows the first embodiment of the present invention, and shows a portion of a shock absorber, which is an instrument that has a reciprocating shaft, and a sealing device disposed in the shock absorber.

A shock absorber 1 comprises a cylindrical housing 2 and a columnar reciprocating shaft 4. The reciprocating shaft 4 is formed from a metal such as steel. The housing 2 is cylindrical and comprises a shaft hole 2A having the reciprocating shaft 4 provided therein. Oil, that is, a liquid L, has been put into the shaft hole 2A. An end wall 3 having an opening 3A formed in the center thereof is formed at a lower end of the housing 2.

A sealing device 6, which is an oil seal, and a rod guide 8 are provided inside the housing 2. Although the details are not shown, the rod guide 8 is fixed to the housing 2. The rod guide 8 guides the reciprocal movement of the reciprocating shaft 4 in the vertical direction in FIG. 1 (that is, the axial direction of the reciprocating shaft 4) and presses the sealing device 6 to the end wall 3.

The sealing device 6 is provided inside the housing 2, and the movement of the sealing device 6 in the lateral direction in FIG. 1 is restricted by the inner peripheral surface of the housing 2. Further, the sealing device 6 is sandwiched by the rod guide 8 and the end wall 3, and the movement of the sealing device 6 along the axial direction of the reciprocating shaft 4 is restricted. The sealing device 6 is provided between the reciprocating shaft 4 and the inner surface of the shaft hole 2A in which the reciprocating shaft 4 is provided, and prevents or reduces leakage of the liquid L from a liquid L side to an atmosphere A side.

The reciprocating shaft 4 is columnar, the shaft hole 2A is cross-sectionally circular, and the sealing device 6 is substantially annular, but FIG. 1 shows only the left half of these parts. FIG. 1 shows a central axis C which is common to the reciprocating shaft 4, the shaft hole 2A, and the sealing device 6.

In this embodiment, the sealing device 6 comprises three separate members, i.e., an oil seal member 10, a dust seal member 12, and a rigid ring (intermediate rigid ring) 14. If necessary, see FIG. 2 which is an exploded cross-sectional view dearly showing these three members.

Figure 2:
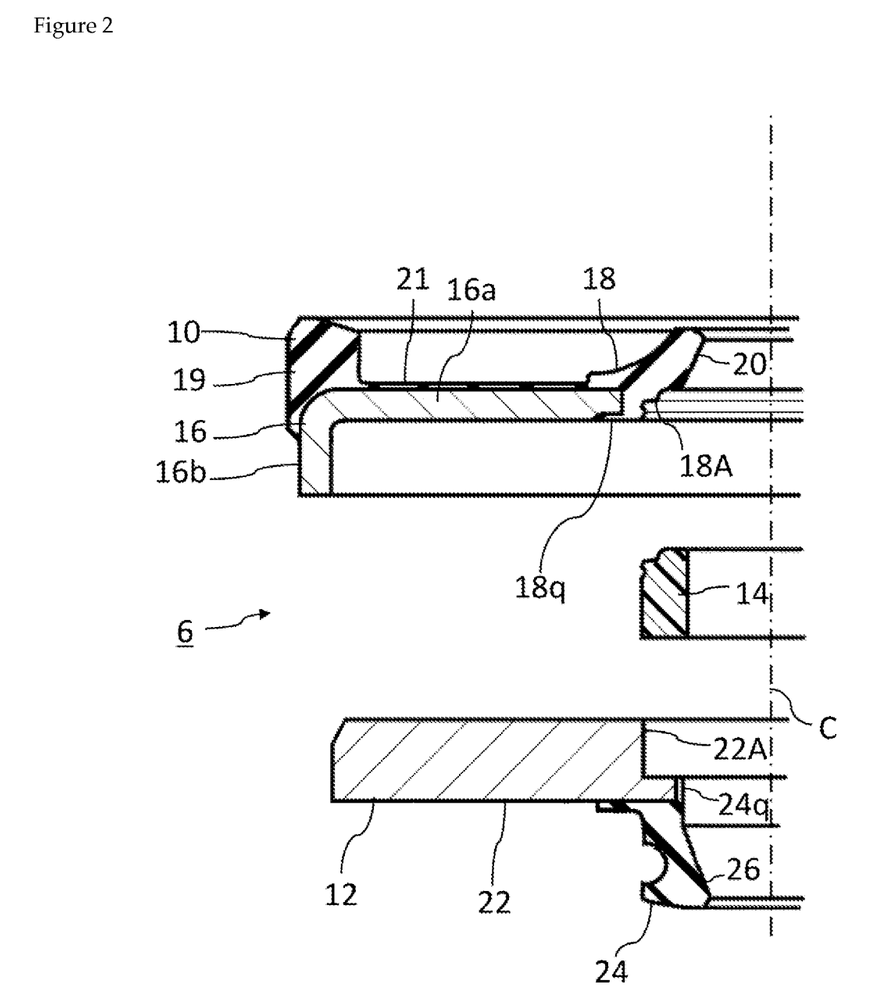
FIG. 2 is an exploded cross-sectional view of the sealing device of FIG. 1.

The oil seal member 10 comprises: a liquid-side rigid ring 16 provided inside the shaft hole 2A and attached to the shaft hole 2A; and a liquid-side elastic ring 18 fixed to the liquid-side rigid ring 16. The liquid-side rigid ring 16 is formed from a rigid body such as a metal. The liquid-side rigid ring 16 has an L-shaped cross-section and comprises an annular portion 16a and a cylindrical portion 16b extending from an outer edge of the annular portion 16a.

The liquid-side elastic ring 18 is formed from an elastic material such as an elastomer and is fixed to the inner peripheral edge of the annular portion 16a of the liquid-side rigid ring 16. The liquid-side elastic ring 18 has formed thereon an oil lip 20 provided radially inward of the liquid-side rigid ring 16. The oil lip 20 makes sealing contact with the outer peripheral surface of the reciprocating shaft 4 and prevents or reduces leakage of a liquid from the liquid L side to the atmosphere A side. When the reciprocating shaft 4 moves in the direction of the central axis C, the reciprocating shaft 4 slides with respect to the oil lip 20.

The liquid-side elastic ring 18 is mainly fixed to a liquid L-side surface of the liquid-side rigid ring 16 of the liquid-side rigid ring 16, but is also fixed to the inner peripheral surface of the liquid-side rigid ring 16, and furthermore, a region 18q which is a section of the liquid-side elastic ring 18 is also fixed to an atmosphere A-side surface of the liquid-side rigid ring 16. The region 18q is compressed by the dust seal member 12.

Moreover, the oil seal member 10 comprises an outer gasket 19. The outer gasket 19 is formed from an elastic material such as an elastomer and is fixed in close adherence with the annular portion 16a and the cylindrical portion 16b of the liquid-side rigid ring 16. The liquid-side rigid ring 16 applies a supporting force on the outer gasket 19 radially outwardly, that is, toward the inner peripheral surface of the shaft hole 2A, and the outer gasket 19 is compressed by the inner peripheral surface of the shaft hole 2A and the liquid-side rigid ring 16. Thus, the outer gasket 19 prevents or reduces leakage of a liquid through an outer portion of the shaft hole 2A from the liquid L side to the atmosphere A side.

Although the outer gasket 19 and the liquid-side elastic ring 18 may be separate, in this embodiment, they are coupled via a thin film portion 21. That is, the liquid-side elastic ring 18, the outer gasket 19, and the thin film portion 21 constitute a continuous integrated elastic portion formed from the same material. The thin film portion 21 is also fixed in close adherence with the liquid-side rigid ring 16. In this embodiment, a protrusion 8a of the rod guide 8 is caused to contact the thin film portion 21 of the oil seal member 10 and a pressing force is applied to the sealing device 6 toward the end wall 3 of the housing 2.

With respect to the oil seal member 10, "attached to the shaft hole 2A" means being attached directly or indirectly to the shaft hole 2A. These may be attached to the shaft hole 2A directly (for example, by press-fitting), and may also be attached to the shaft hole 2A indirectly (for example, as in this embodiment, by being pressed to the end wall 3 by the rod guide 8).

The dust seal member 12 comprises: an atmosphere-side rigid ring 22 detachably fitted in the liquid-side rigid ring 16 of the oil seal member 10; and an atmosphere-side elastic ring 24 fixed to the atmosphere-side rigid ring 22. The atmosphere-side rigid ring 22 is formed from a rigid body such as a metal. The atmosphere-side rigid ring 22 is a circular ring and is provided in an internal space defined by the annular portion 16a and the cylindrical portion 16b of the liquid-side rigid ring 16, with one side surface of the atmosphere-side rigid ring 22 being contacted by the annular portion 16a, the other side surface thereof being contacted by the end wall 3, and the external peripheral surface being caused to contact the inner peripheral surface of the cylindrical portion 16b.

The atmosphere-side elastic ring 24 is formed from an elastic material such as an elastomer and is fixed to the inner peripheral edge of the atmosphere-side rigid ring 22. The atmosphere-side elastic ring 24 has formed thereon a dust lip 26 provided radially inward of the atmosphere-side rigid ring 22. The dust lip 26 contacts the outer peripheral surface of the reciprocating shaft 4 and predominantly fulfills a role of preventing foreign matter (for example, mud, water, dust) from entering from the atmosphere A side to the liquid L side. When the reciprocating shaft 4 moves in the direction of the central axis C, the reciprocating shaft 4 slides with respect to the dust lip 26. The dust lip 26 may make sealing contact with the outer peripheral surface of the reciprocating shaft 4 so as to fulfill a role of preventing or reducing leakage of a liquid.

This sealing device 6 comprises a garter spring 30 wound around the atmosphere-side elastic ring 24. The garter spring 30 applies a force on the dust lip 26 that presses the dust lip 26 to the reciprocating shaft 4. However, the garter ring 30 is not essential. Further, a garter spring may be wound around the liquid-side elastic ring 18 in order to press the oil lip 20 to the reciprocating shaft 4.

In order to contact the outer peripheral surface of the reciprocating shaft 4, the oil lip 20 and the dust lip 26 are caused to elastically deform radially outwardly more than the state shown in FIG. 1. FIG. 1 shows a state in which a sealing device 1 is not provided around the reciprocating shaft 4 (the reciprocating shaft 4 is shown by a dotted line) and does not show deformation of these lips 20, 26.

A concave portion 22A is formed radially inward of the atmosphere-side rigid ring 22 of the dust seal member 12. The concave portion 22A is columnar and open on the liquid L side.

The concave portion 22A has detachably fitted therein a rigid ring 14 (intermediate rigid ring 14) formed from a rigid body such as a resin (for example, polytetrafluoroethylene) or a metal. In this embodiment, the intermediate rigid ring 14 is back-up ring and has formed in the center thereof a through-hole into which the reciprocating shaft 4 is inserted. Further, when the sealing device 6 is assembled, the intermediate rigid ring 14 always contacts the liquid-side elastic ring 18 of the oil seal member 10 and reinforces the liquid-side elastic ring 18.

More specifically, the intermediate rigid ring 14 is detachably fitted in the liquid-side elastic ring 18 of the oil seal member 10 in a concave portion 18A formed radially inward of a region near the dust seal member 12. As shown in the drawings, at least one groove is formed in the concave portion 18A, and a protrusion to be press-fitted in the groove may be formed on the intermediate rigid ring 14. Due to the intermediate rigid ring 14, it is possible to enhance the pressure resistance and the durability of the sealing device 36, and in particular of the oil lip 20. In this embodiment, one intermediate rigid ring 14 is used, but the intermediate rigid ring 14 may also be configured from a plurality of rigid members.

The atmosphere-side elastic ring 24 comprises a region 24q fixed to the inner peripheral surface of the atmosphere-side rigid ring 22, and the intermediate rigid ring 14 is also caused to contact the region 24q.

In this embodiment, the inner diameter of the intermediate rigid ring 14 is smaller than the inner diameter of a region in the liquid-side elastic ring 18 of the oil seal member 10 that contacts the intermediate rigid ring 14, and also smaller than the inner diameter of the region 24q in the atmosphere-side elastic ring 24 of the dust seal member 12 that contacts the intermediate rigid ring 14. Accordingly, the rigid ring 14 is provided between the liquid-side elastic ring 18 and the atmosphere-side elastic ring 24 in a direction parallel to the axial direction of the reciprocating shaft 4.

In this embodiment, between the liquid-side elastic ring 18 of the oil seal member 10 and the atmosphere-side elastic ring 24 of the dust seal member 12, the intermediate rigid ring 14, which is separate from the liquid-side elastic ring 18 and the atmosphere-side elastic ring 24, is provided in a direction parallel to the axial direction of the reciprocating shaft 4, and the liquid-side elastic ring 18 is reinforced by the intermediate rigid ring 14 which is made of a rigid body. The liquid-side elastic ring 18 which has an oil lip 20 formed thereon is reinforced by the liquid-side rigid ring 16, and the atmosphere-side elastic ring 24 which has a dust lip 26 formed thereon is reinforced by the atmosphere-side rigid ring 22, and furthermore, the liquid-side elastic ring 18 is supported by the intermediate rigid ring 14, the intermediate rigid ring 14 being fitted in the concave portion 22A of the atmosphere-side rigid ring 22 fitted in the liquid-side rigid ring 16, and being rigidly supported with a strong supporting force by the atmosphere-side rigid ring 22 and the liquid-side rigid ring 16. Due thereto, the liquid-side rigid ring 16, the atmosphere-side rigid ring 22, and the intermediate rigid ring 14 work as an integrated rigid body and can firmly reinforce the liquid-side elastic ring 18 and the atmosphere-side elastic ring 24. Therefore, it is possible to enhance the pressure resistance and the durability of the sealing device 6, and in particular of the oil lip 20.

In this embodiment, the intermediate rigid ring 14 is detachably fitted in the concave portion 18A formed radially inward of the liquid-side elastic ring 18. Accordingly, after the intermediate rigid ring 14 is fitted in the concave portion 22A of the atmosphere-side rigid ring 22, it is easy to assemble the liquid-side elastic ring 18 of the oil seal member 10 to the intermediate rigid ring 14.

In the same manner as an intermediate rigid ring 47 of a third embodiment described below, at least the inner peripheral surface of the intermediate rigid ring 14 may be formed from a metal that is softer than the outer peripheral surface of the reciprocating shaft 4. In this case, it is possible to use the intermediate rigid ring 14 as a guide for guiding the reciprocal movement of the reciprocating shaft 4. In this case, the eccentricity of the sealing device 6 with respect to the reciprocating shaft 4 decreases and it is possible to prevent or reduce abrasion of or damage to the lips 20, 26 from becoming significant in places.

In this embodiment, when the sealing device 6 is provided between the reciprocating shaft 4 and the inner surface of the shaft hole 2A, both the liquid-side elastic ring 18 and the atmosphere-side elastic ring 24 always contact the intermediate rigid ring 14. Accordingly, when the sealing device 6 is being used, both the liquid-side elastic ring 18 and the atmosphere-side elastic ring 24 are always reinforced by the intermediate rigid ring 14.

Furthermore, in this embodiment, between the liquid-side elastic ring 18 of the oil seal member 10 and the atmosphere-side elastic ring 24 of the dust seal member 12, the intermediate rigid ring 14, which is separate from the liquid-side elastic ring 18 and the atmosphere-side elastic ring 24, is provided in a direction parallel to the axial direction of the reciprocating shaft 4, and therefore, it is possible to reduce the size of a gap between the outer peripheral surface of the reciprocating shaft 4 and the inner peripheral surface of the intermediate rigid ring 14. Since this gap is small, there is little risk of the oil lip 20 or the dust lip 26 entering this gap with the reciprocal movement of the reciprocating shaft 4, even if the pressure of the liquid L is high. Thus, it is possible to further enhance the pressure resistance and the durability of the sealing device 6.

Although an elastic material such as an elastomer may be fixed to the inner peripheral surface of the intermediate rigid ring 14, such a material is unnecessary and is not provided in this embodiment. Due thereto, there is no risk of an elastic material peeling from the inner peripheral surface of the intermediate rigid ring 14, and further, it is possible to set a smaller gap between the intermediate rigid ring 14 and the reciprocating shaft 4.

To produce the oil seal member 10, an elastic member comprising the liquid-side elastic ring 18, the outer gasket 19, and the thin film portion 21 may, for example, be adhered to the liquid-side rigid ring 16 using an adhesive. To produce the dust seal member 12, the atmosphere-side elastic ring 24 may, for example, be adhered to the atmosphere-side rigid ring 22 using an adhesive. Or, the seal member 10 or 12 may be produced by arranging the rigid ring 16 or 22 inside a mold, pouring a liquid elastic material into the mold, and allowing to harden to form the elastic ring 18 or 24.

Second Embodiment

Figure 3:
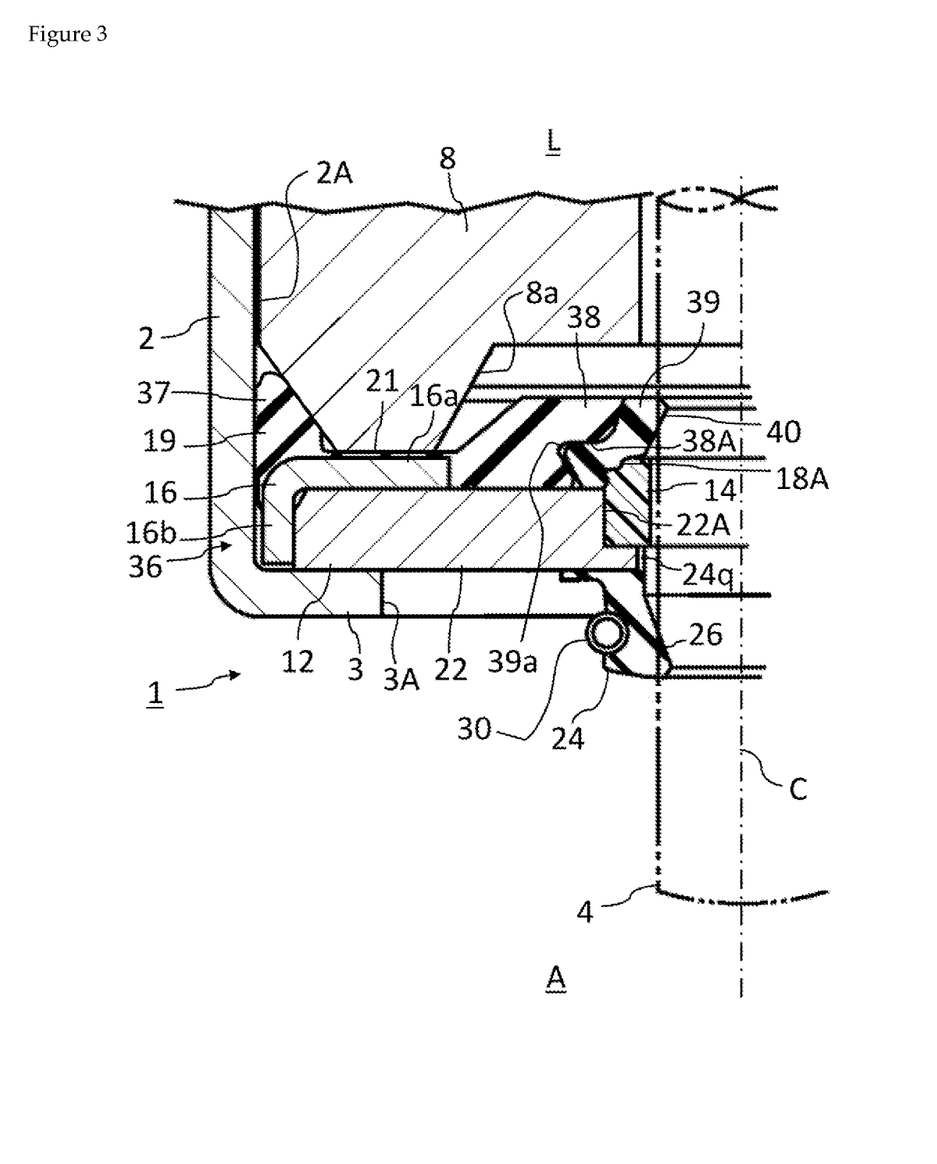
FIG. 3 is a cross-sectional view of a sealing device according to a second embodiment of the present invention.

FIG. 3 is a cross-sectional view of a sealing device 36 according to a second embodiment. Drawings from FIG. 3 onwards show the same constituent elements as those already described, and therefore the same reference signs are used and no detailed description is provided regarding these constituent elements.

This sealing device 36 comprises, instead of the liquid-side elastic ring 18 of the first embodiment, a liquid-side elastic ring 39 which is indirectly attached to the liquid-side rigid ring 16. An oil seal member 37 of the sealing device 36 comprises: a liquid-side rigid ring 16; an outer gasket 19 fixed in close adherence with the liquid-side rigid ring 16; an intermediate elastic ring 38 fixed in close adherence with the liquid-side rigid ring 16; a thin film portion 21 which couples the outer gasket 19 and the intermediate elastic ring 38; and a liquid-side elastic ring 39. The thin film portion 21 is also fixed in close adherence with the liquid-side rigid ring 16.

Although the outer gasket 19 and the intermediate elastic ring 38 may be separate, in this embodiment, they are coupled via the thin film portion 21. That is, the intermediate elastic ring 38, the outer gasket 19, and the thin film portion 21 constitute a continuous integrated elastic portion formed from the same elastic material (for example, an elastomer). In this embodiment, the annular portion 16a of the liquid-side rigid ring 16 is smaller than that of the first embodiment. The intermediate elastic ring 38 is fixed in close adherence with the inner peripheral surface of the annular portion 16a.

Although the liquid-side elastic ring 39 is formed from an elastic material (for example, an elastomer), it is a separate member from the abovementioned elastic portion and is detachably attached to the intermediate elastic ring 38. A V-shaped groove 38A is formed on the inner peripheral surface of the intermediate elastic ring 38, and a protrusion 39a of the liquid-side elastic ring 39 is fitted in this groove 38A.

The liquid-side elastic ring 39 has formed thereon an oil lip 40 provided radially inward of the liquid-side rigid ring 16. The oil lip 40 makes sealing contact with the outer peripheral surface of the reciprocating shaft 4 and prevents or reduces leakage of a liquid from the liquid L side to the atmosphere A side. When the reciprocating shaft 4 moves in the direction of the central axis C, the reciprocating shaft 4 slides with respect to the oil lip 40.

In this embodiment, too, it is possible to achieve the same effects as those of the first embodiment.

As is clear from FIG. 1 and FIG. 3, the different abovementioned embodiments have the dust seal member 12 and the intermediate rigid ring 14 in common, while the details of the oil seal member differ. It is possible to prepare several kinds of oil seal members having different sizes, shapes, structures, or other details, and to select a suitable oil seal member according to the environment in which the sealing device is to be used. That is, in the present invention, the oil seal member, the dust seal member, and the intermediate rigid ring are mutually separate members, and therefore, it is possible to customize the sealing device according to the circumstances. Several kinds of dust seal members having different sizes, shapes, structures, or other details may be prepared and a suitable dust seal member may be selected according to the environment in which the sealing device is to be used. Further, if the oil seal member or dust seal member has degraded due to age, it is possible to exchange only the degraded member.

Third Embodiment

Figure 4:
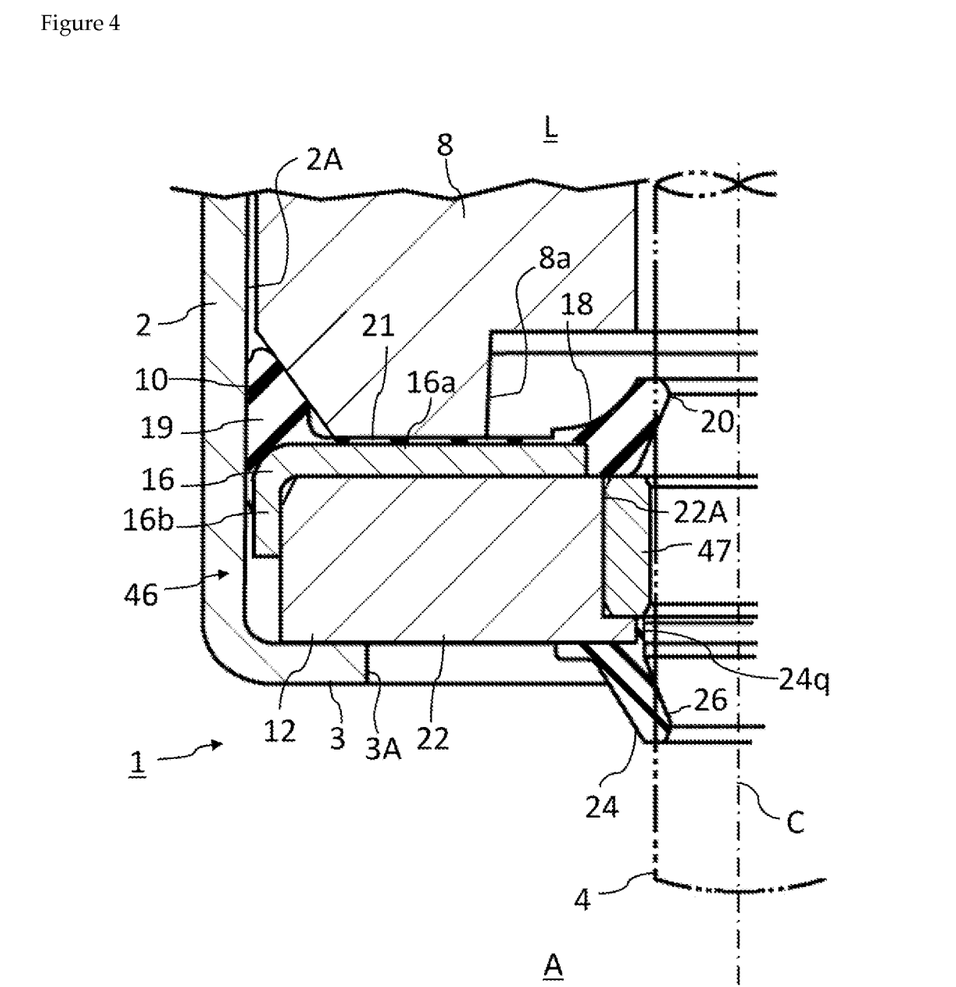
FIG. 4 is a cross-sectional view of a sealing device according to a third embodiment of the present invention.

FIG. 4 is a cross-sectional view of a sealing device 46 according to a third embodiment. This sealing device 46 comprises an intermediate rigid ring 47 instead of the intermediate rigid ring 14, which is a back-up ring, of the first embodiment. The intermediate rigid ring 47 is detachably fitted in the columnar concave portion 22A that is formed radially inward of the atmosphere-side rigid ring 22 of the dust seal member 12 and in which the liquid L side is open.

The intermediate rigid ring 47 is a bush, in other words a circular ring, formed from a rigid body such as a resin or a metal, preferably a metal. The inner peripheral surface of the intermediate rigid ring 47 is subjected to a smoothing process and it is possible to use the intermediate rigid ring 47 as a guide for guiding the reciprocal movement of the reciprocating shaft 4. Thus, by using the intermediate rigid ring 47 of the sealing device 46 as a guide, the eccentricity of the sealing device 46 with respect to the reciprocating shaft 4 decreases and it is possible to prevent or reduce abrasion of or damage to the lips 20, 26 from becoming significant in places.

In order to minimize abrasion of the reciprocating shaft 4, it is preferable that at least the inner peripheral surface of the intermediate rigid ring 47 is formed from a metal that is softer than the external peripheral surface of the reciprocating shaft 4.

For example, the intermediate rigid ring 47 may be formed by sintering from a powder of a copper alloy and a powder of an iron alloy. In this case, being formed into a porous body having multiple minute vacancies is more preferable.

Or, the intermediate rigid ring 47 may be formed from bronze. At least one of lead and polytetrafluoroethylene may also be mixed in the bronze, or the bronze may be impregnated with one of lead and polytetrafluoroethylene.

Or, the intermediate rigid ring 47 may be formed from aluminum or aluminum oxide. The aluminum oxide may also be impregnated with polytetrafluorothylene.

Figure 5:
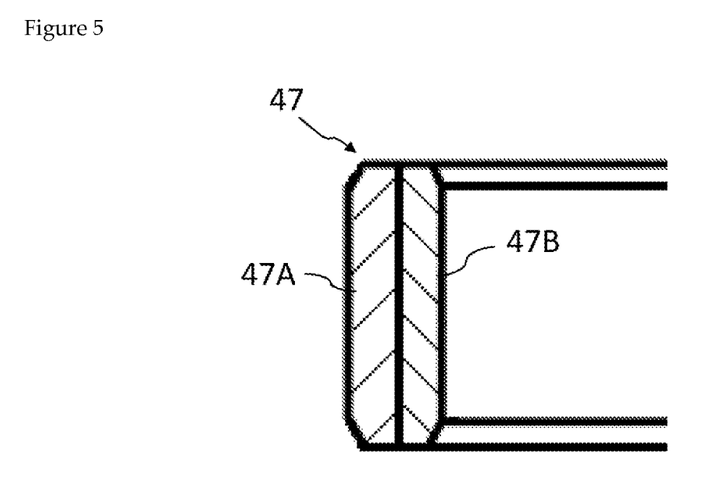
FIG. 5 is a cross-sectional view showing deformation of an intermediate rigid ring of the sealing device of FIG. 4.

As shown in FIG. 5, the intermediate rigid ring 47 may comprise an outer ring 47A and an inner ring 47B fitted inside of the outer ring 47A. It is preferable that the inner ring 47B is formed from a metal that is softer than the external peripheral surface of the reciprocating shaft 4 as described above. It is preferable that the outer ring 47A is formed from a metal that has a higher compression strength than the material of the inner ring 47B. The number of parts of the intermediate rigid ring 47 may be three or more.

In this embodiment, too, it is possible to achieve the same effects as those of the first embodiment.

Unlike the first embodiment, in this embodiment the liquid-side elastic ring 18 of the oil seal member 10 does not have formed thereon a concave portion (corresponding to the concave portion 18A of the first embodiment) for receiving the intermediate rigid ring 47. However, the same as in the first embodiment, even in this embodiment when the sealing device 46 is assembled, the intermediate rigid ring 47 always contacts the liquid-side elastic ring 18 and reinforces the liquid-side elastic ring 18.

In this embodiment, the intermediate rigid ring 47 is not fitted in the liquid-side elastic ring 18. Accordingly, after the intermediate rigid ring 47 is fitted in the concave portion 22A of the atmosphere-side rigid ring 22, it is easy to assemble the liquid-side elastic ring 18 of the oil seal member 10 to the intermediate rigid ring 47.

Although an elastic material such as an elastomer may be fixed to the inner peripheral surface of the intermediate rigid ring 47, such an elastic material is unnecessary and is not provided in this embodiment. Due thereto, there is no risk of an elastic material peeling from the inner peripheral surface of the intermediate rigid ring 47, and further it is possible to minimize a gap between the intermediate rigid ring 47 and the reciprocating shaft 4. Since this gap is small, there is little risk of the oil lip 20 or the dust lip 26 entering this gap with the reciprocal movement of the reciprocating shaft 4, even if the pressure of the liquid L is high, and it is possible to further enhance the pressure resistance and the durability of the sealing device 46.

Fourth Embodiment

Figure 6:
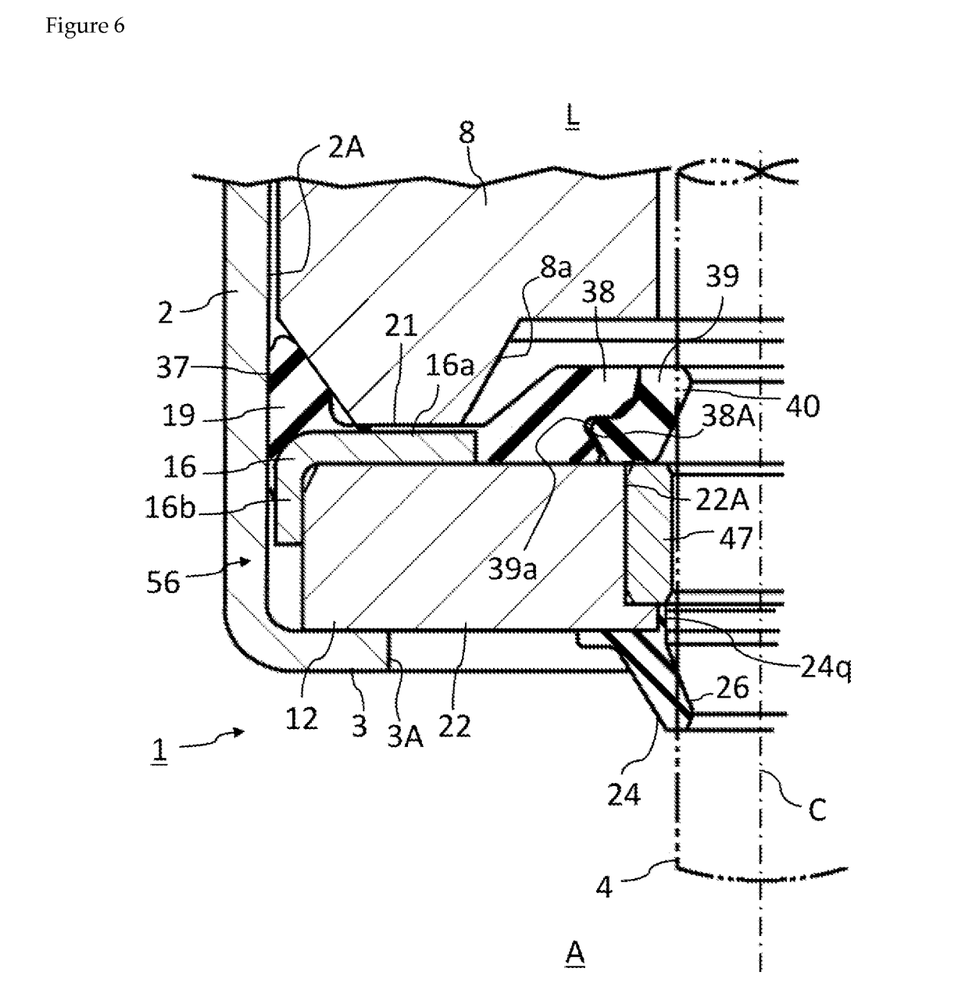
FIG. 6 is a cross-sectional view of a sealing device according to a fourth embodiment of the present invention.

FIG. 6 is a cross-sectional view of a sealing device 56 according to a fourth embodiment. This sealing device 56 comprises, instead of the liquid-side elastic ring 18 of the third embodiment, a liquid-side elastic ring 39 which is indirectly attached to the liquid-side rigid ring 16. An oil seal member 37 of the sealing device 56 comprises: a liquid-side rigid ring 16; art outer gasket 19 fixed in close adherence with the liquid-side rigid ring 16; an intermediate elastic ring 38 fixed in close adherence with the liquid-side rigid ring 16; a thin film portion 21 which couples the outer gasket 19 and the intermediate elastic ring 38; and a liquid-side elastic ring 39. The thin film portion 21 is also fixed in close adherence with the liquid-side rigid ring 16.

Thus, the fourth embodiment is a modification of the third embodiment, and this modification is the same as the modification in the second embodiment with respect to the first embodiment. For details, see the description of the second embodiment. As shown in FIG. 5, in this embodiment, too, the intermediate rigid ring 47 may also be configured from a plurality of parts. In this embodiment, too, it is possible to achieve the same effects as those of the third embodiment.

As is clear from FIG. 4 and FIG. 6, the third embodiment and the fourth embodiment have the dust seal member 12 and the intermediate rigid ring 47 in common, while the details of the oil seal member differ. It is possible to prepare several kinds of oil seal members having different sizes, shapes, structures, or other details, and to select a suitable oil seal member according to the environment in which the sealing device is to be used. That is, in the present invention, the oil seal member, the dust seal member, and the intermediate rigid ring are mutually separate members, and therefore, it is possible to customize the sealing device according to the circumstances. Several kinds of dust seal members having different sizes, shapes, structures, or other details may be prepared and a suitable dust seal member may be selected according to the environment in which the sealing device is to be used. Further, if the oil seal member or dust seal member has degraded due to age, it is possible to exchange only the degraded member.

Various embodiments of the present invention have been described above, but the above descriptions do not limit the present invention and, in the technical scope of the present invention, various modifications can be considered, including deletion, addition, and exchange of constituent elements.

For example, the present invention is not limited to a shock absorber and may also be applied in a sealing device used in another instrument having a reciprocating shaft such as a hydraulic cylinder device.

The shape of the lips and other details are not limited to the embodiments that are shown. Further, a garter spring may be provided to one or both of the oil seal member and the dust seal member.

REFERENCE SIGNS LIST

1 Shock absorber
2 Housing
2A Shaft hole
3 End wall
3A Opening
4 Reciprocating shaft
6, 36, 46, 56 Sealing device
8 Rod guide
10, 37 Oil seal member
12 Dust seal member
14 Rigid ring (intermediate rigid ring)
16 Liquid-side rigid ring
16a Annular portion
16b Cylindrical portion 18 Liquid-side elastic ring
18A Concave portion
19 Outer gasket
20 Oil lip
21 Thin film portion
22 Atmosphere-side rigid ring
22A Concave portion
24 Atmosphere-side elastic ring
26 Dust lip
30 Garter spring
38 Intermediate elastic ring
38A Groove
39 Liquid-side elastic ring
39a Protrusion
40 Oil lip
47 Rigid ring (intermediate rigid ring)
47A Outer ring
47B Inner ring

The invention claimed is:

1. A sealing device to be provided between a reciprocating shaft and an inner surface of a shaft hole in which the reciprocating shaft is provided, wherein the sealing device comprises:
an oil seal member comprising a liquid-side rigid ring made of a rigid body and provided inside the shaft hole, and a liquid-side elastic ring made of an elastic body and attached to the liquid-side rigid ring, the liquid-side elastic ring having formed thereon an oil lip that is provided radially inward of the liquid-side rigid ring and slidably makes sealing contact with the reciprocating shaft;
a dust seal member comprising an atmosphere-side rigid ring made of a rigid body and detachably fitted in the liquid-side rigid ring, and an atmosphere-side elastic ring made of an elastic body and fixed to the atmosphere-side rigid ring, the atmosphere-side elastic ring having formed thereon a dust lip that is provided radially inward of the atmosphere-side rigid ring and slidably contacts the reciprocating shaft; and
an intermediate rigid ring that is made of a rigid body, is detachably fitted in a concave wherein the concave portion extends to a radially innermost surface of the atmosphere-side rigid ring, is provided between the liquid-side elastic ring and the atmosphere-side elastic ring in a direction parallel to the axial direction of the reciprocating shaft, and reinforces the liquid-side elastic ring.

2. The sealing device according to claim 1, wherein the intermediate rigid ring is detachably fitted in the concave portion formed radially inward of the liquid-side elastic ring.

3. The sealing device according to claim 2, wherein at least an inner peripheral surface of the intermediate rigid ring is formed from a metal that is softer than an outer peripheral surface of the reciprocating shaft.

4. The sealing device according to claim 2, wherein an elastic material is not fixed to an inner peripheral surface of the intermediate rigid ring.

5. The sealing device according to claim 1, wherein at least an inner peripheral surface of the intermediate rigid ring is formed from a metal that is softer than an outer peripheral surface of the reciprocating shaft.

6. The sealing device according to claim 5, wherein an elastic material is not fixed to an inner peripheral surface of the intermediate rigid ring.

7. The sealing device according to claim 1, wherein an elastic material is not fixed to an inner peripheral surface of the intermediate rigid ring.

8. The sealing device according to claim 1, wherein the atmosphere-side rigid ring is in direct contact with the liquid-side rigid ring.

9. The sealing device according to claim 1, wherein:
the liquid-side rigid ring comprises an annular portion and a cylindrical portion;
the cylindrical portion of the liquid-side rigid ring has an inner peripheral surface;
the atmosphere-side rigid ring has an external peripheral surface; and
the external peripheral surface of the atmosphere-side rigid ring is in direct contact with the inner peripheral surface of the cylindrical portion of the liquid-side rigid ring.

* * * * *